United States Patent
Zhang et al.

(10) Patent No.: US 10,860,376 B2
(45) Date of Patent: Dec. 8, 2020

(54) COMMUNICATION APPARATUS AND BASE STATION

(71) Applicant: ZTE CORPORATION, Guangdong (CN)

(72) Inventors: Wei Zhang, Guangdong (CN); Fan Wang, Guangdong (CN); Minchao Liang, Guangdong (CN); Jinqing Yu, Guangdong (CN); He Zhang, Guangdong (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 16/472,251

(22) PCT Filed: Dec. 21, 2017

(86) PCT No.: PCT/CN2017/117715
§ 371 (c)(1),
(2) Date: Jun. 21, 2019

(87) PCT Pub. No.: WO2018/113734
PCT Pub. Date: Jun. 28, 2018

(65) Prior Publication Data
US 2019/0317815 A1     Oct. 17, 2019

(30) Foreign Application Priority Data
Dec. 21, 2016 (CN) .......................... 2016 1 1195848

(51) Int. Cl.
*H04W 72/04*     (2009.01)
*H04W 28/16*     (2009.01)
(Continued)

(52) U.S. Cl.
CPC .............. *G06F 9/5011* (2013.01); *G06F 1/10* (2013.01); *H04W 72/04* (2013.01); *H04W 88/08* (2013.01)

(58) Field of Classification Search
CPC .... H04W 16/00–16; H04W 88/08–188; G06F 9/5011; G06F 1/10
See application file for complete search history.

(56) References Cited

U.S. PATENT DOCUMENTS

| 7,151,925 B2 | 12/2006 | Ting et al. | |
| 2010/0185818 A1* | 7/2010 | Sheng ................. | G06F 12/0802 711/130 |

(Continued)

FOREIGN PATENT DOCUMENTS

| CN | 101193084 | 6/2008 |
| CN | 102917476 | 2/2013 |

(Continued)

OTHER PUBLICATIONS

Patent Cooperation Treaty (PCT), International Search Report and Written Opinion for Application PCT/CN2017/117715 filed Dec. 21, 2017, dated Mar. 12, 2082, International Searching Authority, CN.

(Continued)

*Primary Examiner* — San Htun
(74) *Attorney, Agent, or Firm* — McDonald Hopkins LLC (57) ABSTRACT

Provided is a communication apparatus and a base station. The apparatus includes a clock management resource pool and a power management resource pool, and further includes at least one of: a baseband resource pool, a general-purpose computing resource pool, or a network exchange processing resource pool. The baseband resource pool includes at least one baseband processing unit, the general-purpose computing resource pool includes at least one computing unit, the clock management resource pool includes at least one clock management unit, the network exchange processing resource pool includes at least one network exchange pro- (Continued)

cessing unit, and the power management resource pool includes at least one power management unit.

18 Claims, 6 Drawing Sheets

(51) Int. Cl.
    *G06F 9/50*     (2006.01)
    *G06F 1/10*     (2006.01)
    *H04W 88/08*     (2009.01)

(56) References Cited

U.S. PATENT DOCUMENTS

| | | | | |
|---|---|---|---|---|
| 2012/0096167 A1* | 4/2012 | Free | ................ | G06F 9/5011 709/226 |
| 2014/0132305 A1* | 5/2014 | Gaide | ................ | H03K 19/096 326/93 |
| 2015/0253378 A1* | 9/2015 | DeLaPuente | ................ | G01R 31/31907 702/123 |
| 2016/0135175 A1* | 5/2016 | Tarlazzi | ................ | H04W 28/08 370/329 |
| 2017/0188412 A1* | 6/2017 | Noriega | ................ | H04W 88/08 |

FOREIGN PATENT DOCUMENTS

| | | |
|---|---|---|
| CN | 105992344 | 10/2016 |
| EP | 2472995 | 7/2012 |
| JP | 2007529926 | 10/2007 |
| JP | 201682569 | 10/2017 |
| WO | 2016197991 | 12/2016 |

OTHER PUBLICATIONS

Extended European Search Report for Application 178846150, PCT/US2017/117715, dated Jul. 29, 2020, 9 pgs., European Patent Office, Germany.

Japan Patent Office (JPO), Notification of Reasons for Rejection for Patent Application No. 2019-533590, drafted Jul. 3, 2020, Fourth Patent Examination Department, Japan.

* cited by examiner

At least one baseband processing unit of the baseband resource pool performs baseband signal processing, and when the baseband signal is processed, transmits data that needs to be computed externally, through the network exchange processing resource pool, to at least one computing unit of the general-purpose computing resource pool   110 at least one computing unit of the general-purpose computing resource pool computes the received data and returns the computation result to the corresponding baseband processing unit through the network exchange processing resource pool   120 after receiving the computation result, the corresponding baseband processing unit performs baseband signal processing according to the computation result to obtain a corresponding baseband signal processing result   130

FIG. 11

COMMUNICATION APPARATUS AND BASE STATION

CROSS-REFERENCE TO RELATED APPLICATION

This application is a 35 U.S.C. 371 national stage filing of PCT Application No. PCT/CN2017/117715 filed on Dec. 21, 2017, which claims priority to Chinese Patent Application No. 201611195848.X, filed on Dec. 21, 2016, each of which are incorporated herein in their entirety by reference.

TECHNICAL FIELD

The present disclosure relates to the technical field of communications, for example, a communication apparatus and a base station, which may be applied to a 5G communication system having requirements for large traffic and high bandwidth.

BACKGROUND

With the continuous development of wireless communication technologies, users have increasingly higher demands for big data, video transmission, video telephony, virtual reality, mass data connection, and low-latency and ultra-reliable communication, and have increasingly higher requirements on bandwidth of the communication system. In the future, 5G communication will meet the bandwidth demand of 10 Gbps to 20 Gbps, and the delay requirements of end-to-end processing of the communication system is becoming higher and higher. At the same time, with the continuous progress of the chip design process, the integration of the communication device is becoming higher and higher from the original 90 nm to the 16 nm or even the future 7 nm. Information technology (IT)-network function virtualization (NFV) and IT-software defined network (SDN) are becoming more and more ideal. In this case, the base station communication system which has the rigid design and the limited power consumption area is no longer able to meet the user's use requirements.

SUMMARY

The present disclosure provides a communication apparatus and a base station that can meet the use requirements for a communication network having large traffic, high bandwidth, and low delay.

The present disclosure provides a communication apparatus. The apparatus includes a clock management resource pool and a power management resource pool, and further includes at least one of: a baseband resource pool, a general-purpose computing resource pool, or a network exchange processing resource pool.

The baseband resource pool is configured to implement baseband processing.

The general-purpose computing resource pool is configured to perform data computation.

The network exchange processing resource pool is configured to implement data interaction.

The clock management resource pool is configured to provide a clock signal for each resource pool.

The power management resource pool is configured to provide a power supply for the each resource pool.

The baseband resource pool includes at least one baseband processing unit, the general-purpose computing resource pool includes at least one computing unit, the clock management resource pool includes at least one clock management unit, the network exchange processing resource pool includes at least one network exchange processing unit, and the power management resource pool includes at least one power management unit.

Any two resource pools are connected to each other through a backplane. The baseband resource pool, the general-purpose computing resource pool and the network exchange processing resource pool have a same backplane interface, are connected to the backplane through the same backplane interface, and each have a corresponding high-speed interface via which data exchange with an external device is performed.

Optionally, in condition that the number of clock management units in the clock management resource pool is greater than or equal to 2, the clock management units in the clock management resource pool are connected to each other.

In condition that the number of power management units in the power management resource pool is greater than or equal to 2, the power management units in the power management resource pool are connected to each other.

In condition that the number of baseband processing units in the baseband resource pool is greater than or equal to 2, each baseband processing unit in the baseband resource pool is connected to each other.

In condition that the number of computing units in the general-purpose computing resource pool is greater than or equal to 2, the computing units in the general-purpose computing resource pool are connected to each other.

In condition that the number of network exchange processing units in the network exchange processing resource pool is greater than or equal to 2, the network exchange processing units in the network exchange processing resource pool are connected to each other.

Optionally, each of the clock management units in the clock management resource pool, each of the baseband processing units in the baseband resource pool, each of the computing units in the general-purpose computing resource pool, and each of the network exchange processing units in the network exchange processing resource pool have the same backplane interface.

Optionally, in condition that the apparatus includes the network exchange processing resource pools, the clock management units in the clock management resource pool are connected to each other through the network exchange processing unit, the power management units in the power management resource pool are connected to each other through the network exchange processing units, the baseband processing units in the baseband resource pool are connected to each other through the network exchange processing units, and the computing units in the general-purpose computing resource pool are connected to each other through the network exchange processing units.

Optionally, the high-speed interface is a common public radio interface (CPRI) or an Ethernet interface.

Optionally, the number of power management units in the power management resource pool is determined by a total power supply demand of the apparatus.

Optionally, the number of baseband processing units in the baseband resource pool is determined by the amount of data to be processed by the baseband resource pool and a total bandwidth demand of the baseband resource pool.

Optionally, the number of computing units in the general-purpose computing resource pool is determined by the amount of data to be processed by the general-purpose computing resource pool and a total bandwidth demand of the general-purpose computing resource pool.

Optionally, the number of network exchange processing units in the network exchange processing resource pool is determined by data interactive traffic between the baseband resource pool and the general-purpose computing resource pool, and a total bandwidth demand of the network exchange processing resource pool.

Optionally, the baseband processing unit is provided with at least one optical module; the baseband processing unit is provided with at least one optical module; and the baseband resource pool is connected to the external device through the at least one optical module of the baseband processing unit.

Optionally, a combination deployment mode of units in the apparatus is predetermined based on an actual application demand.

Optionally, a parameter of a frame in which each resource pool is placed is determined based on a size of space occupied by the each resource pool.

The present disclosure further provides a base station which may include any communication apparatus described above.

The communication apparatus and the base station provided in the present disclosure can meet the future use requirements for a communication network having large traffic, high bandwidth, and low delay.

DETAILED DESCRIPTION

The embodiment provides a communication apparatus which may be applied to a network side device such as a base station. The apparatus may include a clock management resource pool and a power management resource pool, and may further include at least one of: a baseband resource pool, a general-purpose computing resource pool, or a network exchange processing resource pool.

The baseband resource pool described above is used for implementing baseband processing, and the general-purpose computing resource pool is used for performing data computation. The network exchange processing resource pool is used for implementing data interaction, for example, data interaction between any resource pool in the communication apparatus described above and data interaction between the communication apparatus described above and the external device. For example, when the communication apparatus described above includes the baseband resource pool, the general-purpose computing resource pool and the network exchange processing resource pool, the network exchange processing resource pool may be used for implementing data interaction between the baseband resource pool and the general-purpose computing resource pool.

The clock management resource pool described above is used for providing a clock signal for each resource pool, for example, a clock signal for each resource pool in the apparatus other than the clock management resource pool.

The power management resource pool described above is used for providing a power for each resource pool, for example, providing a power for each resource pool in the apparatus other than the power management resource pool.

In practical applications, the above-described baseband resource pool includes at least one baseband processing unit for performing baseband resource processing, the general-purpose computing resource pool includes at least one computing unit for performing data computation, the clock management resource pool includes at least one clock management unit, the network exchange processing resource pool includes at least one network exchange processing unit, and the power management resource pool includes at least one power management unit.

The resource pools described above may be connected to each other through a backplane. For example, each resource pool may be connected to a corresponding backplane, connection between the resource pools is implemented through the backplane, and data interaction between the resource pools is performed through the backplane. The baseband resource pool, the general-purpose computing resource pool, and the network exchange processing resource pool have the same backplane interface. The baseband resource pool, the general-purpose computing resource pool, and the network exchange processing resource pool each perform data interaction via a high-speed interface. Here, the high-speed interface may be an interface with a transmission rate of 500 MB/s or higher. For example, the high-speed interface may be a CPRI or an Ethernet interface.

Based on the communication apparatus described above, the following embodiments are provided.

Figure 1:
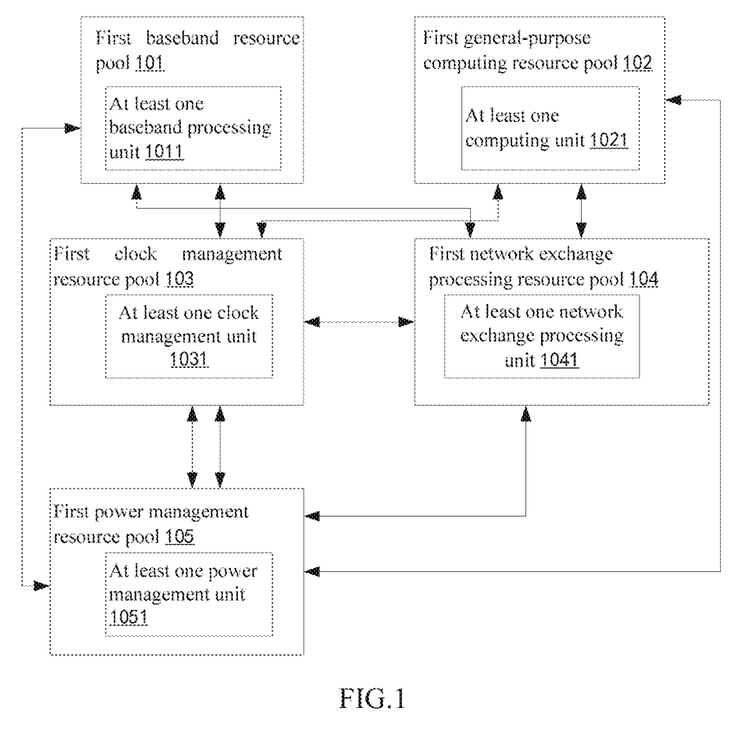
FIG. 1 is a structural diagram of a communication apparatus according to an embodiment.

The embodiment provides a communication apparatus. FIG. 1 is a structural diagram of a communication apparatus according to the embodiment. As shown in FIG. 1, the apparatus includes a first clock management resource pool 103, a first power management resource pool 105, a first baseband resource pool 101, a first general-purpose computing resource pool 102, and a first network exchange processing resource pool 104.

A communication connection is formed between the first baseband resource pool 101 and the first general-purpose computing resource pool 102. For example, the first baseband resource pool 101 and the first general-purpose computing resource pool 102 may be connected via an Ethernet.

For example, the first baseband resource pool 101 is used for performing baseband uplink and downlink resource processing; and in practical implementation, the first baseband resource pool 101 may be formed by at least one baseband processing unit 1011. The baseband processing unit may be used for baseband signal processing.

Figure 2:
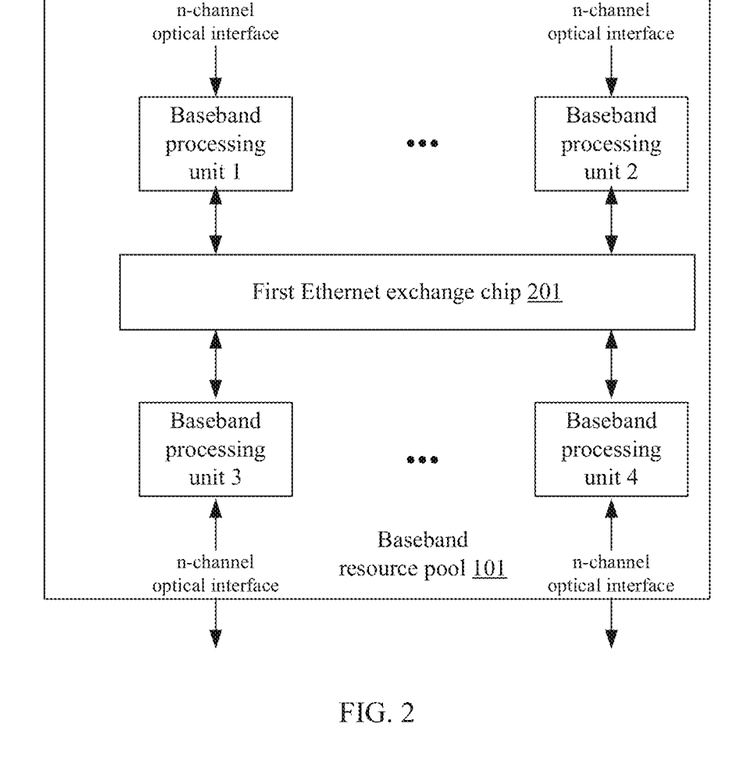
FIG. 2 is a structural diagram of a first baseband resource pool according to an embodiment.

FIG. 2 is a structural diagram of a first baseband resource pool according to an embodiment. As shown in FIG. 2, when the number of baseband processing units in the first baseband resource pool is greater than or equal to 2, the baseband processing units may be connected to each other. For example, the baseband processing units may be internally connected to each other through a first Ethernet exchange chip 201, and each baseband processing unit may further be provided with an n-channel optical interface. Where n is an integer greater than or equal to 1. In FIG. 2, baseband processing units 1 to 4 represent four different baseband processing units, and the interface between the first Ethernet exchange chip 201 and the baseband processing unit may be 2×, 4×, 8×, or the like.

Figure 3:
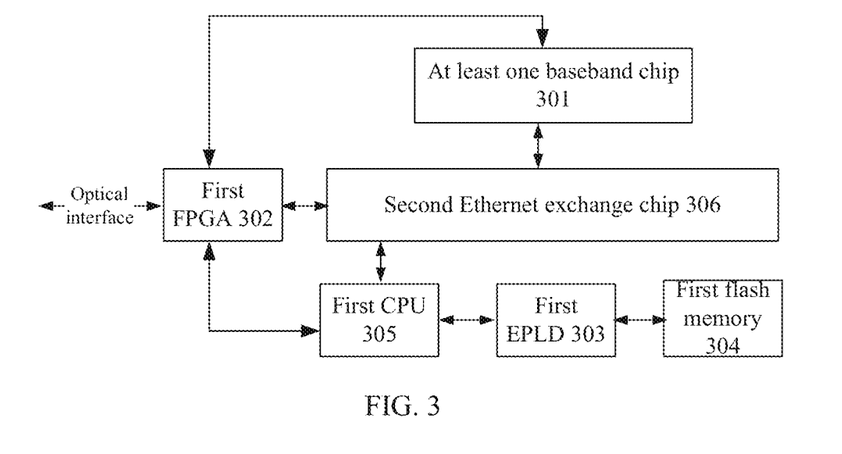
FIG. 3 is a structural diagram of a baseband processing unit according to an embodiment.

FIG. 3 is a structural diagram of a baseband processing unit according to an embodiment. As shown in FIG. 3, the baseband processing unit includes at least one baseband chip 301, a first field programmable logic device (FPGA) 302, a first erasable programmable logic device (EPLD) 303, a first flash memory 304, and a first central processing unit (CPU) 305. Interconnection and data forwarding and interaction between devices in the baseband processing unit may be performed through a second Ethernet exchange chip 306 which may be a large-capacity Ethernet exchange chip. The baseband processing unit may externally provide multiple optical module interfaces (i.e., the optical interfaces in FIG. 2). The optical module interfaces also belong to the high-speed interface and may be flexibly configured as an Ethernet mode or a CPRI mode. The optical module interface may be a 25 G optical module interface or a 56 G optical module interface. When the baseband processing unit is configured as the Ethernet mode, the baseband processing unit may be connected to the external device via the optical module interface and the Ethernet. When the baseband processing unit is configured as the CPRI mode, the baseband processing unit may be connected to the external device via the optical module interface and the CPRI. The external device may be a radio remote unit (RRU).

Optionally, the number of baseband processing units in the first baseband resource pool may be pre-determined according to the amount of data to be processed by the first baseband resource pool and a total bandwidth demand of the first baseband resource pool. Here, the total bandwidth demand of the first baseband resource pool may be used for indicating a bandwidth demand at the time when the first baseband resource pool performs data interaction with the outside. The greater the amount of data to be processed by the first baseband resource pool or the total bandwidth demand of the first baseband resource pool is, the greater the number of baseband processing units in the first baseband resource pool is. For example, according to the amount of data to be processed by the first baseband resource pool and the total bandwidth demand of the first baseband resource pool, it is determined that at least M1 baseband processing units are required, and the number of baseband processing units in the first baseband resource pool is greater than or equal to M1. Where M1 is an integer greater than or equal to 1.

The first general-purpose computing resource pool 102 described above may be used for performing data computation and data storage. For example, the first general-purpose computing resource pool 102 may perform computation on the data transmitted by the first baseband resource pool and transmit the computation result to the first baseband resource pool.

Referring to FIG. 1, the above-described first general-purpose computing resource pool 102 may be formed by at least one computing unit 1021. When the number of computing units in the first general-purpose computing resource pool 102 is greater than or equal to 2, the computing units of the first general-purpose computing resource pool 102 is connected to each other. For example, data interaction between the computing units of the first general-purpose computing resource pool 102 is performed via a unified backplane interface or via an Ethernet exchange chip.

Figure 4:
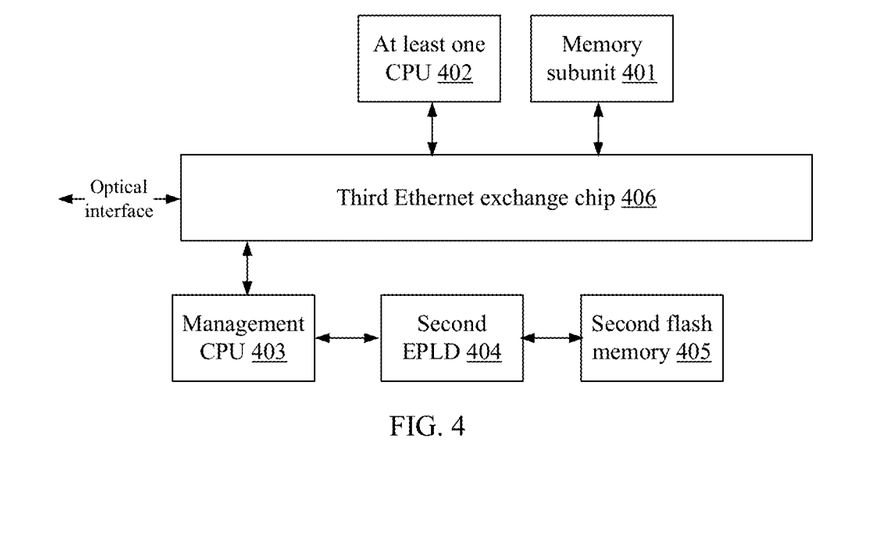
FIG. 4 is a structural diagram of a computing unit according to an embodiment.

FIG. 4 is a structural diagram of a computing unit according to an embodiment. As shown in FIG. 4, the computing unit is responsible for relevant data storage and computation, and may include a storage subunit 401, at least one CPU 402, a management CPU 403, a second EPLD 404, a second flash memory 405 and a third Ethernet exchange chip 406. The storage subunit 401 may be a large-capacity storage hard disk. The management CPU 403 is a CPU connecting the second EPLD 404 and the third Ethernet exchange chip 406. The computing unit may further include a double data rate (DDR) synchronous dynamic random access memory. With reference to FIG. 4, CPUs may be connected to each other through the third Ethernet exchange chip 406, and each CPU may perform a data read/write operation on the storage subunit 401. The third Ethernet exchange chip 406 may communicate with the outside via an optical interface.

Optionally, the number of computing units in the first general-purpose computing resource pool may be pre-determined according to the amount of data to be processed by the first general-purpose computing resource pool and the total bandwidth demand of the first general-purpose computing resource pool. The amount of data to be processed by the first general-purpose computing resource pool may be used for indicating the amount of computation to be processed by the first general-purpose computing resource pool. The total bandwidth demand of the first general-purpose computing resource pool may indicate a bandwidth demand at the time when the first general-purpose computing resource pool performs data interaction with the outside. The greater the amount of data to be processed by the first general-purpose computing resource pool or the total bandwidth demand of the first general-purpose computing resource pool is, the greater the number of computing units in the first general-purpose computing resource pool is. For example, according to the amount of data to be processed by the first general-purpose computing resource pool and the total bandwidth demand of the first general-purpose computing resource pool, it is determined that at least M2 computing units are required, and the number of computing units in the first general-purpose computing resource pool is greater than or equal to M2. Where M2 is an integer greater than or equal to 1.

Referring to FIG. 1, the first clock management resource pool 103 is used for implementing clock management. For example, the first clock management resource pool 103 is used for separately providing a clock signal to each resource pool in the communication apparatus other than the first clock management resource pool. For another example, the first clock management resource pool 103 may distribute clocks to the first baseband resource pool 101, the first general-purpose computing resource pool 102, the first network exchange processing resource pool 104 and the first power management resource pool 105.

Optionally, the first clock management resource pool 103 may be formed by at least one clock management unit 1031. When the number of clock management units 1031 in the first clock management resource pool 103 is greater than or equal to 2, the clock management units in the first clock management resource pool 103 are connected to each other. For example, the clock management units 1031 of the first clock management resource pool 103 may be disposed on the same backplane, the clock management units 1031 may be connected to each other via a backplane interface, and distributes clocks to other resource pools through the backplane interface. Or, data interaction between clock management units 1031 of the first clock management resource pool 103 may be performed through the Ethernet exchange chip.

Figure 5:
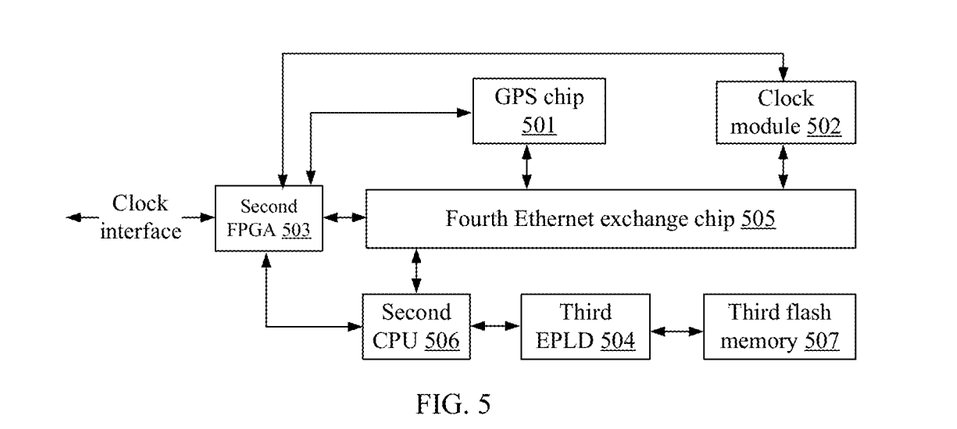
FIG. 5 is a structural diagram of a clock management unit according to an embodiment.

FIG. 5 is a structural diagram of a clock management unit according to an embodiment. As shown in FIG. 5, the clock management unit is responsible for providing a clock timing function for each resource pool in the communication apparatus other than the first clock management resource pool. The clock management unit may include a global positioning system (GPS) chip 501 for providing a clock correction function, a clock module 502, a second FPGA 503 for generating a clock signal, a third EPLD 504, a fourth Ethernet exchange chip 505, a second CPU 506 and a third flash memory 507. The second FPGA 503 may further provide multiple clock interfaces. The GPS chip 501, the clock module 502, the second FPGA 503, and the second CPU 506 may be connected to each other through the fourth Ethernet exchange chip 505. Optionally, resource pools in the communication apparatus may be disposed on the same backplane, the clock of each resource pool in the communication apparatus may be distributed through the backplane on which the clock management unit is located, and clock synchronization between the resource pools in the communication apparatus may be implemented by the institute of electrical and electronics engineers (IEEE) 1588 standards.

Generally, the number of clock management units 1031 in the first clock management resource pool 301 is 1. In order to ensure reliability of the communication apparatus, multiple clock management units 1031 may be provided, one of the multiple clock management units is the main clock management unit, and the remaining clock management units are standby clock management units.

The first network exchange processing resource pool 104 may be used for implementing data interaction between any two resource pools in the apparatus other than the network exchange processing resource pool. For example, the first network exchange processing resource pool 104 is used for implementing data interaction between the first baseband resource pool and the first general-purpose computing resource pool. The baseband processing unit in the first baseband resource pool 101 may be connected to the first network exchange processing resource pool 104 through an Ethernet exchange chip of the baseband processing unit, and the computing unit of the first general-purpose computing resource pool 102 may be connected to the first network exchange processing resource pool through an Ethernet exchange chip of the computing unit. Thus, data interaction between the first baseband resource pool 101 and the first general-purpose computing resource pool 102 can be achieved.

Referring to FIG. 1, the first network exchange processing resource pool 104 may be formed by at least one network exchange processing unit 1041. When the number of network exchange processing units 1041 in the first network exchange processing resource pool 104 is greater than or equal to 2, the network exchange processing units 1041 in the first network exchange processing resource pool 104 are connected to each other. For example, data interaction between network exchange processing units 1041 in the first network exchange processing resource pool 104 is performed via the same backplane interface or via the Ethernet exchange chip.

Figure 6:
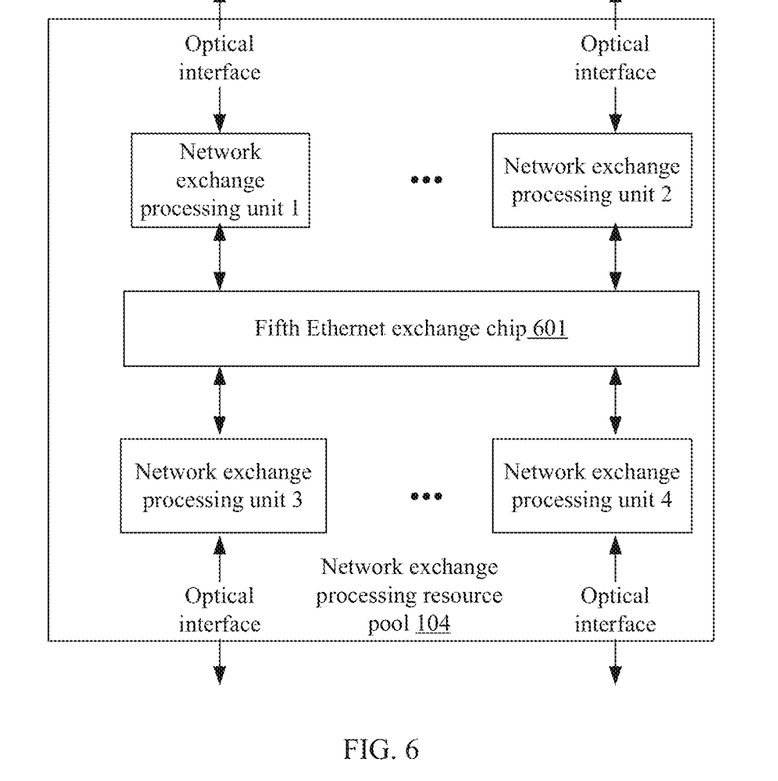
FIG. 6 is a structural diagram of a first network exchange processing resource pool according to an embodiment.

FIG. 6 is a structural diagram of a first network exchange processing resource pool according to an embodiment. As shown in FIG. 6, the network exchange unit is used for implementing data interaction between the first baseband resource pool 101 and the first general-purpose computing resource pool 102. When the number of network exchange processing units in the first network exchange processing resource pool 104 is greater than or equal to 2, the network exchange processing units may be connected to each other. For example, the network exchange processing units may be internally connected to each other through a fifth Ethernet exchange chip 601, and each network exchange processing unit may further be provided with multiple channels of optical interfaces. The fifth Ethernet exchange chip 601 may be connected to the Ethernet exchange chip of the baseband processing unit and the Ethernet exchange chip of the computing unit, separately. In FIG. 6, network exchange processing units 1 to 4 represent four different network exchange processing units, and the interface between the fifth Ethernet exchange chip 601 and each of the network exchange processing units may be 2×, 4×, 8×, or the like. In practical implementation, the first network exchange processing resource pool 104 may further include an FPGA, an EPLD, a CPU, a flash memory, and the like.

Optionally, the number of network exchange processing units in the first network exchange processing resource pool may be pre-determined according to data interactive traffic between the first baseband resource pool and the first general-purpose computing resource pool and a total bandwidth demand of the first network exchange processing resource pool. Here, the greater the data interactive traffic between the first baseband resource pool and the first general-purpose computing resource pool or the total bandwidth demand of the first network exchange processing resource pool is, the greater the number of network exchange processing units in the first network exchange resource pool is. For example, according to the amount of data to be processed by the first general-purpose computing resource pool and the total bandwidth demand of the first network exchange processing resource pool, it is determined that at least M3 network exchange processing units are required, and the number of network exchange processing units in the first network exchange processing resource pool is greater than or equal to M3. Where M3 is an integer greater than or equal to 1.

The first power management resource pool 105 is used for providing a power for each resource pool in the apparatus separately other than the first power management resource pool. For example, the first power management resource pool 105 may provide a power supply function and a power control function for the first baseband resource pool 101, the first general-purpose computing resource pool 102, the first clock management resource pool 103 and the first network exchange processing resource pool 104.

Referring to FIG. 1, the first power management resource pool 105 may be formed by at least one power management unit 1051. When the number of power management units in the first power management resource pool 105 is greater than or equal to 2, the power management units in the first power management resource pool 105 are connected to each other. For example, the power management units of the first power management resource pool 105 may be disposed on the same backplane, and the power management units may be connected to each other via the same backplane interface and supplies power to other resource pools via the backplane interface. The power management units of the first power management resource pool 105 may also be connected to each other through the network exchange processing unit.

The power management unit may be configured to supply power to the communication apparatus and control related power of the communication apparatus.

Optionally, the number of power management units in the first power management resource pool may be pre-determined according to a total power supply demand of the communication apparatus. The greater the total power supply demand of the communication apparatus is, the greater the number of power management units in the first power management resource pool is. For example, according to the total power supply demand of the communication apparatus, it is determined that at least M4 power management units are required, and the number of power management units in the first power management resource pool is greater than or equal to M4. Where M4 is an integer greater than or equal to 1.

Optionally, each clock management unit in the first clock management resource pool 103, each baseband processing unit in the first baseband resource pool 101, each computing unit in the general-purpose computing resource pool 102, and each network exchange processing unit in the first network exchange processing resource pool 104 have the same backplane interface, which may be an Ethernet interface or a high-speed interface that connects an external device by using a high-speed signal line.

Optionally, the clock management units in the clock management resource pool may also be connected to each other through the network exchange processing unit to implement data interaction. The power management units in the power management resource pool may also be connected to each other through the network exchange processing unit to implement data interaction, the baseband processing units in the baseband resource pool may also be connected to each other through the network exchange processing unit to implement data interaction. The computing units in the general-purpose computing resource pool may also be connected to each other through the network exchange processing unit to implement data interaction.

With reference to FIG. 1, the above-described communication apparatus is a communication apparatus based on IT-Building Base band Unit (BBU) architecture, and may be applied to a 5G communication system. In an embodiment, a unified management of communication between resource pools of the communication apparatus is implemented. The first clock management resource pool and the first power management resource pool belong to the public resource pool, and perform data distribution and communication interaction through the backplane to provide time and power management for other resource pools. The first baseband resource pool and the first general-purpose computing resource pool belong to the dedicated resource pool, and perform data distribution and communication interaction through the network exchange resource pool.

Here, multiple resource pools in the communication apparatus may be deployed in a centralized manner, or may be deployed in a distributed manner.

A combination deployment mode of multiple units in the communication apparatus may be pre-determined according to an actual application demand. The combination deployment mode here is used for indicating the deployment position of each unit in the communication apparatus. For example, the combination deployment mode may indicate that any two units in the communication apparatus are centrally deployed. For example, the combination deployment mode may indicate that one baseband processing unit in the first baseband resource pool and one computing unit in the first general-purpose computing resource pool are centrally deployed at the same position. The actual application demand here may be a networking scenario demand. For example, for a custom server including multiple computing units, the networking scenario demand may be to centrally deploy the multiple computing units to form the custom server; for a centralized coordination exchange device including multiple network exchange processing units, the networking scenario demand may be to centrally deploy the multiple network exchange processing units to form the centralized coordination exchange device; and for a BBU distributed base station, the networking scenario demand may be to centrally deploy multiple baseband processing units, one clock management unit and one network exchange processing unit to form the BBU distributed base station.

Figure 7:
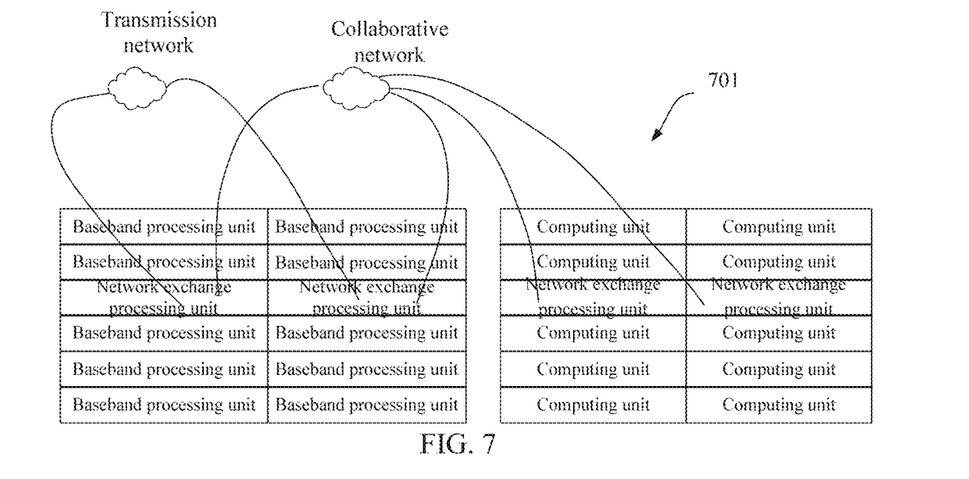
FIG. 7 is a schematic diagram illustrating an optional structure of a base station having information technology-building base band unit (IT-BBU) centralized deployment according to an embodiment.

FIG. 7 is a schematic diagram illustrating an optional structure of a base station having IT-BBU centralized deployment according to an embodiment. As shown in FIG. 7, a base station 701 having the IT-BBU centralized deployment may include a first portion and a second portion. Each portion includes multiple baseband processing units and two network exchange processing units. The two network exchange processing units of each portion may be connected to each other via a transmission network. Any one of the network exchange processing units of the first portion and any one of the network exchange processing units of the second portion may be connected to each other via a collaborative network.

For the base station having the IT-BBU centralized deployment shown in FIG. 7, the networking scenario demand may be to deploy the baseband processing units and the network exchange processing units according to the structure of the base station having the IT-BBU centralized deployment.

Optionally, the parameter of the frame in which each resource pool in the apparatus is placed is pre-configured, and the parameter may include the number of frames and the size of each frame. Each resource pool may be placed in a frame, and the parameter of the frame in which each resource pool in the apparatus is placed may be a form factor parameter, for example, the parameter of the frame in which each resource pool in the apparatus is placed may be 1 U, 2 U, 4 U, 6 U, etc. Here, U represents the unit of the outer size of the frame. When the parameter of the frame in which each resource pool in the apparatus is placed is the form factor parameter, the parameter of the frame in which each resource pool in the apparatus is placed may be determined by the space occupied by each resource pool. For example, when it is determined, based on the space occupied by any one of the resource pools, that the parameter of the frame corresponding to the one of the resource pools in the apparatus is at least 2 U, the parameter of the frame corresponding to the one of the resource pools in the apparatus may be 2 U, 4 U or 6 U.

Further, one or more of the following parameters may be flexibly configured by software:

1) a networking scenario demand;
2) the parameter of the frame in which each resource pool in the apparatus is placed;
3) the number of baseband processing units in the first baseband resource pool;
4) the number of clock management units in the first clock management resource pool;
5) the number of network exchange processing units in the first network exchange processing resource pool;

6) the number of computing units in the first general-purpose computing resource pool; and 7) the number of clock management units in the first clock management resource pool.

In the communication apparatus of the embodiment, each of the resource pool is defined, and the resource pools are connected to each other. Based on a new IT virtualization architecture platform, the related resources can be flexibly configured and managed. Different networking demands and network deployment can be met by flexible parameter configuration, and communication network demands for large traffic, high bandwidth, and low delay in the future can be better met. At the same time, convergence between the wireless network and the wired network can be better achieved, and flexible networking demands in the future are met. The communication apparatus of the embodiment will be very competitive in the future.

The application scenario involved in the embodiments may include deploying a low-frequency macro base station deployed in base station and a wired network in a centralized computer room. Optionally, the low-frequency macro base station here is a low-frequency macro base station of a 5G network.

The actual application scenario may further include that: the number of antennas of the same cell may be greater than or equal to 512, the bandwidth of the cell is up to 200 M, the peak rate is up to 20 Gbps, the user experience rate of macro coverage is up to 1 Gbps, and the user experience rate of the hot spot coverage is up to 300 Mbps.

The first baseband resource pool, the first general-purpose computing resource pool, the first clock management resource pool, the first network exchange processing resource pool, and the first power management resource pool may be defined according to the actual application scenario, and the corresponding parameters are configured. The networking scenario may be a networking scenario of a base station having a IT-BBU centralized deployment shown in FIG. 7, is configured with 20 baseband processing units, 4 network exchange processing units, 1 computing unit, 3 power management units, and 4 clock management units, and the parameter of the frame in which each resource pool in the apparatus is placed is 6 U. 20 baseband processing units may be configured in two 6 U frames, 4 network exchange processing units may be configured in two 6 U frames, 4 clock management units may be configured in two 6 U frames, 3 power management units may be configured in three 6 U frames, and 1 computing unit may be configured in one 6 U frame.

Figure 8:
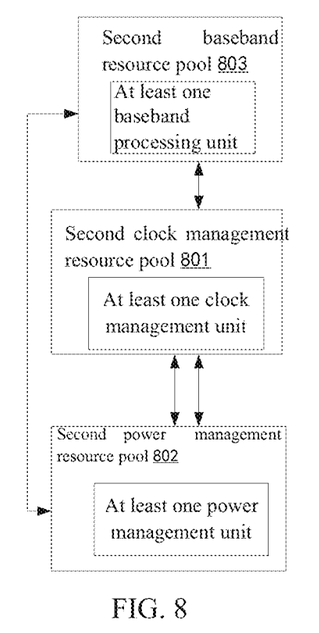
FIG. 8 is a structural diagram of a communication apparatus according to an embodiment.

The embodiment further provides a communication apparatus. FIG. 8 is a structural diagram of the communication apparatus according to an embodiment. As shown in FIG. 8, the apparatus may include a second clock management resource pool 801, a second power management resource pool 802 and a second baseband resource pool 803.

For example, the second baseband resource pool 803 is used for performing baseband uplink and downlink resource processing; the second clock management resource pool 801 is used for implementing clock management and may provide a clock signal for the second power management resource pool 802 and the second baseband resource pool 803, separately; and the second power management resource pool 802 is used for providing a power for the second clock management resource pool 801 and the second baseband resource pool 803, separately.

The second baseband resource pool 803 may be formed by at least one baseband processing unit, and the baseband processing unit may be used for baseband signal processing.

The second clock management resource pool 801 may be formed by at least one clock management unit, and the clock management unit may implement a clock distribution and clock management function. The second power management resource pool 802 may be formed by at least one power management unit, and the power management unit is used for supplying power to the communication apparatus and for controlling the related power of the communication apparatus.

The second baseband resource pool 803 has the same implementation manner as the first baseband resource pool 101, the second clock management resource pool 801 has the same implementation manner as the first clock management resource pool 103, and the second power management resource pool 802 has the same implementation manner as the first power management resource pool 105, and repetition is not made here.

In the communication apparatus provided in the embodiment, each of the resource pools is defined, and the resource pools is connected to each other. Based on a new IT virtualization architecture platform, the related resources can be flexibly configured and managed. Different networking demands and network deployment can be met by flexible parameter configuration, and communication network demands for large traffic, high bandwidth, and low delay in the future can be met. At the same time, convergence between the wireless network and the wired network can be better achieved, and flexible networking demands in the future are met. The communication apparatus provided in the embodiment will be very competitive in the future.

Figure 9:
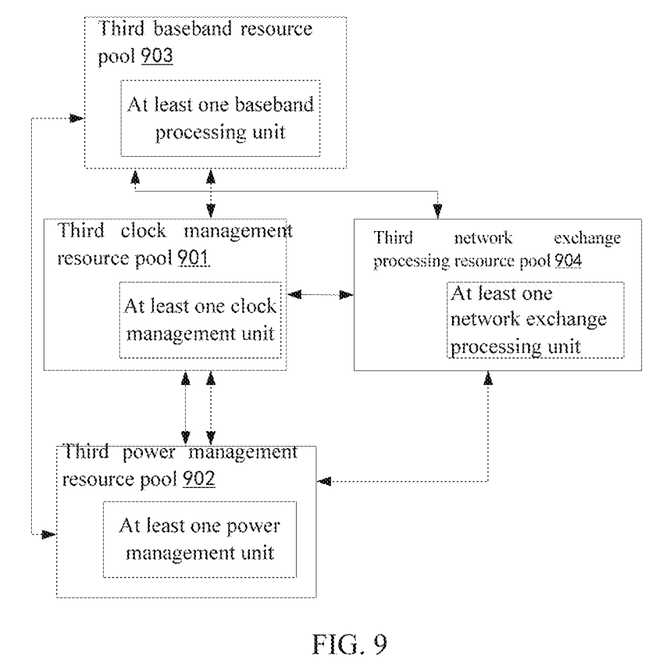
FIG. 9 is a structural diagram of another communication apparatus according to an embodiment.

The embodiment further provides a communication apparatus. FIG. 9 is a structural diagram of a communication apparatus according to an embodiment. As shown in FIG. 9, the apparatus may include a third clock management resource pool 901, a third power management resource pool 902, a third baseband resource pool 903, and a third network exchange processing resource pool 904.

The third baseband resource pool 903 is used for performing baseband uplink and downlink resource processing. The third clock management resource pool 901 is used for implementing clock management, and may provide a clock signal to the third power management resource pool 902, the third baseband resource pool 903, and the third network exchange processing resource pool 904, separately. The third power management resource pool 902 is used for supplying a power to the third clock management resource pool 901, the third baseband resource pool 903 and the third network exchange processing resource pool 904, separately. The third network exchange processing resource pool 904 may be used for implementing data interaction between any two of the remaining resource pools.

The third baseband resource pool 903 may be formed by at least one baseband processing unit, and the baseband processing unit may be used for baseband signal processing. The third clock management resource pool 901 may be formed by at least one clock management unit, and the clock management unit may implement a clock distribution and clock management function. The third power management resource pool 902 may be formed by at least one power management unit, and the power management unit is used for supplying power to the communication apparatus and for controlling the related power of the communication apparatus.

The third network exchange processing resource pool 904 may be formed by at least one network exchange processing unit.

The third baseband resource pool 903 has the same implementation manner as the first baseband resource pool 101, the third clock management resource pool 901 has the same implementation manner as the first clock management resource pool 103, the third power management resource pool 902 has the same implementation manner as the first power management resource pool 105, and the third network exchange processing resource pool 904 has the same implementation manner as the first network exchange processing resource pool 104, and repetition is not made here.

In the communication apparatus provided in the embodiment, each of the resource pools is defined, and the resource pools are connected to each other. Based on a new IT virtualization architecture platform, the related resources can be flexibly configured and managed. Different networking demands and network deployment can be met by flexible parameter configuration, and communication network demands for large traffic, high bandwidth, and low delay in the future are met. At the same time, convergence between the wireless network and the wired network can be better achieved, and flexible networking demands in the future are met. The communication apparatus provided in the embodiment will be very competitive in the future.

Figure 10:
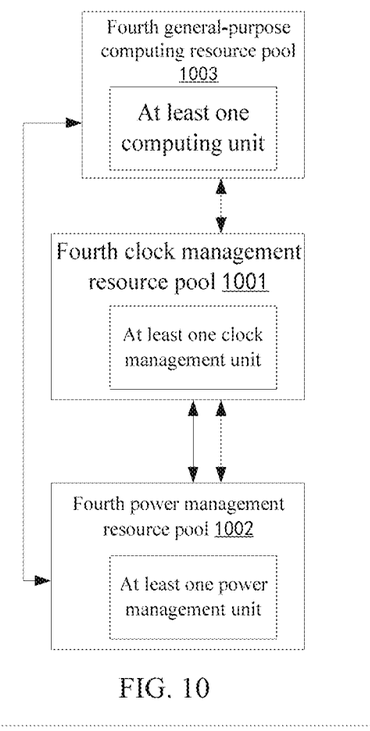
FIG. 10 is a structural diagram of another communication apparatus according to an embodiment.

The embodiment further provides a communication apparatus. FIG. 10 is a structural diagram of a communication apparatus according to the embodiment. As shown in FIG. 10, the apparatus may include a fourth clock management resource pool 1001, a fourth power management resource pool 1002 and a fourth general-purpose computing resource pool 1003.

For example, the fourth general-purpose computing resource pool 1003 may be used for performing data computation and data storage; the fourth clock management resource pool 1001 is used for implementing clock management, and may provide a clock signal for the fourth power management resource pool 1002 and the fourth general-purpose computing resource pool 1003, separately; and the fourth power management resource pool 1002 is used for providing a power for the fourth clock management resource pool 1001 and the fourth general-purpose computing resource pool 1003, separately.

Optionally, the fourth general-purpose computing resource pool 1003 may be formed by at least one computing unit; the fourth clock management resource pool 1001 described above may be formed by at least one clock management unit, and the clock management unit may implement a clock distribution and clock management function; and the fourth power management resource pool 1002 may be formed by at least one power management unit, and the power management unit is used for supplying power to the communication apparatus and implementing control of the related power of the communication apparatus.

The fourth general-purpose computing resource pool 1003 has the same implementation manner as the first general-purpose computing resource pool 102, the fourth clock management resource pool 1001 has the same implementation manner as the first clock management resource pool 103, and the fourth power management resource pool 1002 has the same implementation manner as the first power management resource pool 105, and repetition is not made here.

In the communication apparatus provided in the embodiment, each of the resource pool is defined, and the resource pools are connected to each other. Based on a new IT virtualization architecture platform, the related resources can be flexibly configured and managed. Different networking demands and network deployment can be met by flexible parameter configuration, and communication network demands for large traffic, high bandwidth, and low delay in the future are met. At the same time, convergence between the wireless network and the wired network can be better achieved, and flexible networking demands in the future are met. The communication apparatus provided in the embodiment will be very competitive in the future.

According to the communication apparatus provided in the embodiment described above, the embodiment further provides a data processing method of the communication apparatus. The apparatus may include a clock management resource pool, a power management resource pool, a baseband resource pool, a general-purpose computing resource pool and a network exchange processing resource pool. The baseband resource pool may include at least one baseband processing unit, the general-purpose computing resource pool may include at least one computing unit, the clock management resource pool may include at least one clock management unit, the network exchange processing resource pool may include at least one network exchange processing unit, and the power management resource pool may include at least one power management unit.

Figure 11:
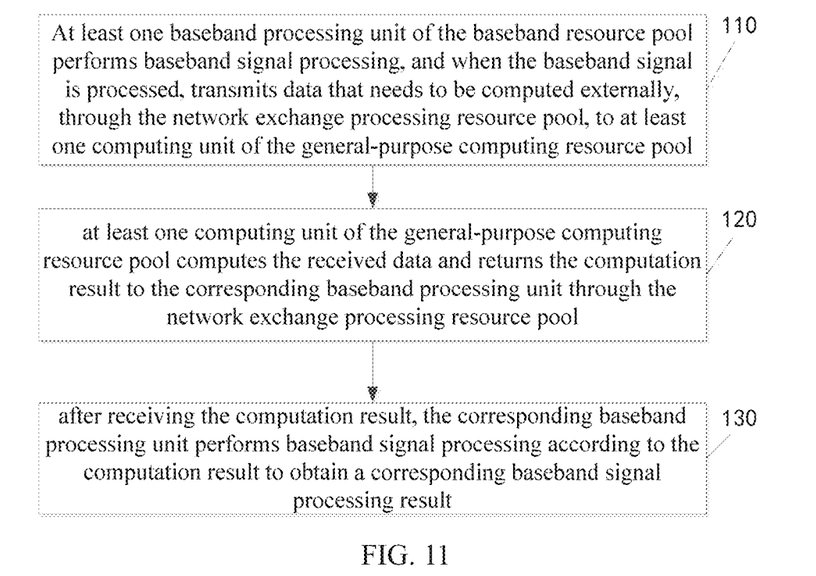
FIG. 11 is a flowchart of a data processing method of a communication apparatus according to an embodiment.

FIG. 11 is a flowchart of the data processing method of the communication apparatus according to the embodiment. As shown in FIG. 11, the flow may include the steps described below.

In a step 110, at least one baseband processing unit of the baseband resource pool performs baseband signal processing, and when the baseband signal is processed, transmits data that needs to be computed externally, through the network exchange processing resource pool, to at least one computing unit of the general-purpose computing resource pool.

For example, the baseband processing unit may transmit data to at least one computing unit of the general-purpose computing resource pool through the network exchange processing unit; and optionally, the baseband processing unit may further transmit the computation manner of the data to at least one computing unit of the above general-purpose computing resource pool. The data computation manner of each computing unit of the general-purpose computing resource pool may also be a predetermined computation manner.

Optionally, each baseband processing unit may determine, according to the amount of processed data during baseband signal processing, whether a general-purpose computing resource pool needs to be used, and determine the number of computing units of the general-purpose computing resource pool to be used.

In a step 120, at least one computing unit of the general-purpose computing resource pool computes the received data and returns the computation result to the corresponding baseband processing unit through the network exchange processing resource pool.

For example, each computing unit may transmit the computation result to a corresponding baseband processing unit through a network exchange processing unit.

In a step 130, after receiving the computation result, the corresponding baseband processing unit performs baseband signal processing according to the computation result to obtain a corresponding baseband signal processing result.

Optionally, the data processing method of the communication apparatus further includes the clock management resource pool separately providing a clock signal for each resource pool in the apparatus other than the clock management resource pool, and the power management resource pool separately providing a power for each resource pool in the apparatus other than the power management resource pool.

The contents of the embodiments may be provided as a method, a system or a computer program product. Therefore, the embodiments may take the form of a hardware embodiment, a software embodiment or an embodiment with a combination of software and hardware. Moreover, the embodiments may take the form of a computer program product implemented in one or more computer-usable storage media (including, but not limited to, a disk memory and an optical memory) that includes computer-usable program code.

The above embodiments are described with reference to flowcharts and/or block diagrams of methods, devices (systems) and computer program products provided in the embodiments. The computer program instructions can be used to implement each flow and/or block in the flowcharts and/or block diagrams and a combination of flows and/or blocks in the flowcharts and/or block diagrams. These computer program instructions may be provided to a general-purpose computer, a special-purpose computer, an embedded processor or a processor of another programmable data processing device to produce a machine so that instructions executed by a computer or the processor of another programmable data processing device produce a means for implementing functions specified in one or more flows in the flowcharts and/or one or more blocks in the block diagrams.

These computer program instructions may also be stored in a computer-readable memory which may direct the computer or another programmable data processing device to operate in a particular manner so that the instructions stored in the computer-readable memory produce a manufactured product including an instructing means. The instructing means implements the functions specified in one or more flows in the flowcharts and/or one or more blocks in the block diagrams.

These computer program instructions may also be loaded onto the computer or another programmable data processing device so that a series of operation steps are performed on the computer or another programmable device to produce processing implemented by the computer. Therefore, instructions executed on the computer or another programmable device provide steps for implementing the functions specified in one or more flows in the flowcharts and/or one or more blocks in the block diagrams.

INDUSTRIAL APPLICABILITY

In the communication apparatus and the base station provided in the present disclosure, each of the resource pools is defined, and the resource pools are connected to each other. Based on a new IT virtualization architecture platform, the related resources can be flexibly configured and managed. Different networking demands and network deployment can be met by flexible parameter configuration, and communication network demands for large traffic, high bandwidth, and low delay in the future can be met. At the same time, convergence between the wireless network and the wired network can be better achieved, and flexible networking demands in the future are met. The communication apparatus and the base station provided in the present disclosure will be very competitive in the future.

What is claimed is:

1. A communication apparatus, comprising a clock management resource pool and a power management resource pool, and further comprising at least two of:
   a baseband resource pool, a general-purpose computing resource pool, or a network exchange processing resource pool, wherein
   the baseband resource pool is configured to implement baseband processing;
   the general-purpose computing resource pool is configured to perform data computation;
   the network exchange processing resource pool is configured to implement data interaction;
   the clock management resource pool is configured to provide a clock signal for each resource pool;
   the power management resource pool is configured to provide a power for the each resource pool;
   the baseband resource pool comprises at least one baseband processing unit, the general-purpose computing resource pool comprises at least one computing unit, the clock management resource pool comprises at least one clock management unit, the network exchange processing resource pool comprises at least one network exchange processing unit, and the power management resource pool comprises at least one power management unit; and
   any two resource pools are connected to each other through a backplane, wherein the at least two of the baseband resource pool, the general-purpose computing resource pool and the network exchange processing resource pool have a same backplane interface and are connected to the backplane through the same backplane interface, and each of the at least two of the baseband resource pool, the general-purpose computing resource pool and the network exchange processing resource pool has a respective high-speed interface via which data exchange with an external device is performed; and
   wherein in condition that a number of clock management units in the clock management resource pool is greater than or equal to 2, the clock management units in the clock management resource pool are connected to each other;
   in condition that a number of power management units in the power management resource pool is greater than or equal to 2, the power management units in the power management resource pool are connected to each other;
   in condition that a number of baseband processing units in the baseband resource pool is greater than or equal to 2, the baseband processing units in the baseband resource pool are connected to each other;
   in condition that a number of computing units in the general-purpose computing resource pool is greater than or equal to 2, the computing units in the general-purpose computing resource pool are connected to each other; and
   in condition that a number of network exchange processing units in the network exchange processing resource pool is greater than or equal to 2, the network exchange processing units in the network exchange processing resource pool are connected to each other.

2. The apparatus of claim 1, wherein in condition that the apparatus comprises the baseband resource pool, the general-purpose computing resource pool, and the network exchange processing resource pool, each of the clock management units in the clock management resource pool, each of the baseband processing units in the baseband resource pool, each of the computing units in the general-purpose computing resource pool, and each of the network exchange processing units in the network exchange processing resource pool have the same backplane interface.

3. The apparatus of claim 1, wherein in condition that the apparatus comprises the network exchange processing resource pools, the clock management units in the clock management resource pool are connected to each other through the network exchange processing units, the power management units in the power management resource pool are connected to each other through the network exchange processing units, the baseband processing units in the baseband resource pool are connected to each other through the network exchange processing units, and the computing units in the general-purpose computing resource pool are connected to each other through the network exchange processing units.

4. The apparatus of claim 1, wherein the high-speed interface is a common public radio interface (CPRI) or an Ethernet interface.

5. The apparatus of claim 1, wherein the number of the power management units in the power management resource pool is determined by a total power supply demand of the apparatus.

6. The apparatus of claim 1, wherein the number of the baseband processing units in the baseband resource pool is determined by an amount of data to be processed by the baseband resource pool and a total bandwidth demand of the baseband resource pool.

7. The apparatus of claim 1, wherein the number of the computing units in the general-purpose computing resource pool is determined by an amount of data to be processed by the general-purpose computing resource pool and a total bandwidth demand of the general-purpose computing resource pool.

8. The apparatus of claim 1, wherein the number of the network exchange processing units in the network exchange processing resource pool is determined by data interactive traffic between the baseband resource pool and the general-purpose computing resource pool, and a total bandwidth demand of the network exchange processing resource pool.

9. The apparatus of claim 1, wherein the baseband processing unit is provided with at least one optical module; and the baseband resource pool is connected to the external device through the at least one optical module of the baseband processing unit.

10. The apparatus of claim 1, wherein a combination deployment mode of units in the apparatus is predetermined based on an actual application demand.

11. The apparatus of claim 1, wherein a parameter of a frame in which at least one resource pool is placed is determined based on a size of space occupied by the each resource pool.

12. A base station, comprising a communication apparatus, wherein the communication apparatus comprises a clock management resource pool and a power management resource pool, and further comprises at least two of: a baseband resource pool, a general-purpose computing resource pool, or a network exchange processing resource pool, wherein the baseband resource pool is configured to implement baseband processing;
the general-purpose computing resource pool is configured to perform data computation;
the network exchange processing resource pool is configured to implement data interaction;
the clock management resource pool is configured to provide a clock signal for each resource pool;
the power management resource pool is configured to provide a power for the each resource pool;
the baseband resource pool comprises at least one baseband processing unit, the general-purpose computing resource pool comprises at least one computing unit, the clock management resource pool comprises at least one clock management unit, the network exchange processing resource pool comprises at least one network exchange processing unit, and the power management resource pool comprises at least one power management unit; and
any two resource pools are connected to each other through a backplane, wherein the at least two of the baseband resource pool, the general-purpose computing resource pool and the network exchange processing resource pool have a same backplane interface and are connected to the backplane through the same backplane interface, and each of the at least two of the baseband resource pool, the general-purpose computing resource pool and the network exchange processing resource pool has a respective high-speed interface via which data exchange with an external device is performed; and wherein in condition that a number of clock management units in the clock management resource pool is greater than or equal to 2, the clock management units in the clock management resource pool are connected to each other;
in condition that a number of power management units in the power management resource pool is greater than or equal to 2, the power management units in the power management resource pool are connected to each other;
in condition that a number of baseband processing units in the baseband resource pool is greater than or equal to 2, the baseband processing units in the baseband resource pool are connected to each other;
in condition that a number of computing units in the general-purpose computing resource pool is greater than or equal to 2, the computing units in the general-purpose computing resource pool are connected to each other; and
in condition that a number of network exchange processing units in the network exchange processing resource pool is greater than or equal to 2, the network exchange processing units in the network exchange processing resource pool are connected to each other.

13. The base station of claim 12, wherein in condition that the apparatus comprises the baseband resource pool, the general-purpose computing resource pool, and the network exchange processing resource pool, each of the clock management units in the clock management resource pool, each of the baseband processing units in the baseband resource pool, each of the computing units in the general-purpose computing resource pool, and each of the network exchange processing units in the network exchange processing resource pool have the same backplane interface.

14. The base station of claim 12, wherein in condition that the communication apparatus comprises the network exchange processing resource pools, the clock management units in the clock management resource pool are connected to each other through the network exchange processing units, the power management units in the power management resource pool are connected to each other through the network exchange processing units, the baseband processing units in the baseband resource pool are connected to each other through the network exchange processing units, and the computing units in the general-purpose computing resource pool are connected to each other through the network exchange processing units.

15. The base station of claim 12, wherein the high-speed interface is a common public radio interface (CPRI) or an Ethernet interface.

16. The base station of claim 12, wherein the number of the power management units in the power management resource pool is determined by a total power supply demand of the communication apparatus.

17. The base station of claim 12, wherein the number of the baseband processing units in the baseband resource pool is determined by an amount of data to be processed by the baseband resource pool and a total bandwidth demand of the baseband resource pool.

18. The base station of claim 12, wherein the number of the computing units in the general-purpose computing resource pool is determined by an amount of data to be processed by the general-purpose computing resource pool and a total bandwidth demand of the general-purpose computing resource pool.

* * * * *